US008417443B2

(12) United States Patent
Ishikawa

(10) Patent No.: US 8,417,443 B2
(45) Date of Patent: Apr. 9, 2013

(54) TRAVEL PATTERN INFORMATION OBTAINING DEVICE, TRAVEL PATTERN INFORMATION OBTAINING METHOD, AND TRAVEL PATTERN INFORMATION OBTAINING PROGRAM

(75) Inventor: Hiroki Ishikawa, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 12/867,102

(22) PCT Filed: Feb. 16, 2009

(86) PCT No.: PCT/JP2009/000605

§ 371 (c)(1), (2), (4) Date: Aug. 11, 2010

(87) PCT Pub. No.: WO2009/118987

PCT Pub. Date: Oct. 1, 2009

(65) Prior Publication Data

US 2010/0324806 A1 Dec. 23, 2010

(30) Foreign Application Priority Data

Mar. 27, 2008 (JP) ................................ 2008-084028
Mar. 27, 2008 (JP) ................................ 2008-084042

(51) Int. Cl.
*G06F 19/00* (2011.01)

(52) U.S. Cl.
USPC ........... 701/119; 701/117; 701/118; 701/410; 701/414; 701/418; 701/532; 701/533; 340/990; 340/539.13; 340/906; 340/435; 340/439; 340/901; 340/902; 340/903; 340/933; 340/988

(58) Field of Classification Search .................. 701/418, 701/117, 118, 119, 410, 414, 533; 340/990, 340/995, 906, 435, 439, 539.13
See application file for complete search history.

(56) References Cited

U.S. PATENT DOCUMENTS 5,787,383 A * 7/1998 Moroto et al. ................ 701/418
6,131,064 A 10/2000 Vieweg
6,338,021 B1 1/2002 Yagyu et al.
6,356,836 B1 3/2002 Adolph
7,433,889 B1 10/2008 Barton
7,925,423 B2 4/2011 Howarter et al.

(Continued)

FOREIGN PATENT DOCUMENTS

CN 1704302 A 12/2005
CN 2901460 Y 5/2007

(Continued)

OTHER PUBLICATIONS

Translated Japanese Office Action issued in Application No. 2008-084042; Dated May 18, 2010.

(Continued)

*Primary Examiner* — Redhwan K Mawari
(74) *Attorney, Agent, or Firm* — Oliff & Berridge, PLC

(57) ABSTRACT

Vehicle speed identification information for identifying vehicle speed of a vehicle on a road is obtained for a plurality of vehicles. Based on a distribution of the vehicle speed identification information, the vehicle speed identification information is classified into groups corresponding to motions of the vehicle. An occurrence probability of a motion of the vehicle is obtained based on the classification.

10 Claims, 8 Drawing Sheets

U.S. PATENT DOCUMENTS

| | | | | |
|---|---|---|---|---|
| 2002/0026278 | A1* | 2/2002 | Feldman et al. | 701/117 |
| 2002/0049527 | A1 | 4/2002 | Kohno et al. | |
| 2003/0128135 | A1 | 7/2003 | Poltorak | |
| 2003/0216857 | A1 | 11/2003 | Feldman et al. | |
| 2005/0091176 | A1* | 4/2005 | Nishiuma et al. | 706/45 |
| 2007/0146136 | A1 | 6/2007 | Chen et al. | |
| 2007/0208493 | A1* | 9/2007 | Downs et al. | 701/117 |

FOREIGN PATENT DOCUMENTS

| | | | |
|---|---|---|---|
| DE | 196 06 258 | C1 | 4/1997 |
| EP | 1 793 204 | B1 | 5/2010 |
| JP | A-09-073595 | | 3/1997 |
| JP | A-2001-126180 | | 5/2001 |
| JP | A-2001-165684 | | 6/2001 |
| JP | A-2007-322304 | | 12/2007 |
| WO | WO 2007/049110 | A1 | 5/2007 |
| WO | WO 2008/015966 | A1 | 2/2008 |

OTHER PUBLICATIONS

Written Reply to the Written Opinion of the International Searching Authority issued in Application No. PCT/JP2009/000605; Dated Jun. 10, 2009.
International Search Report issued in Application No. PCT/JP2009/000605; Dated Jun. 10, 2009.
Japanese Patent Office, Notification of Reason for Refusal mailed Oct. 11, 2011 in Japanese Patent Application No. 2008-084028 w/Partial English-language Translation.
Sep. 10, 2012 Search Report issued in Chinese Patent Application No. 20090216 (with translation).
Aug. 3, 2012 Office Action issued in U.S. Appl. No. 12/867,186.
Partial Translation of Nov. 5, 2012 Office Action issued in Chinese Patent Application No. 200980108213.3.

* cited by examiner

Fig. 4
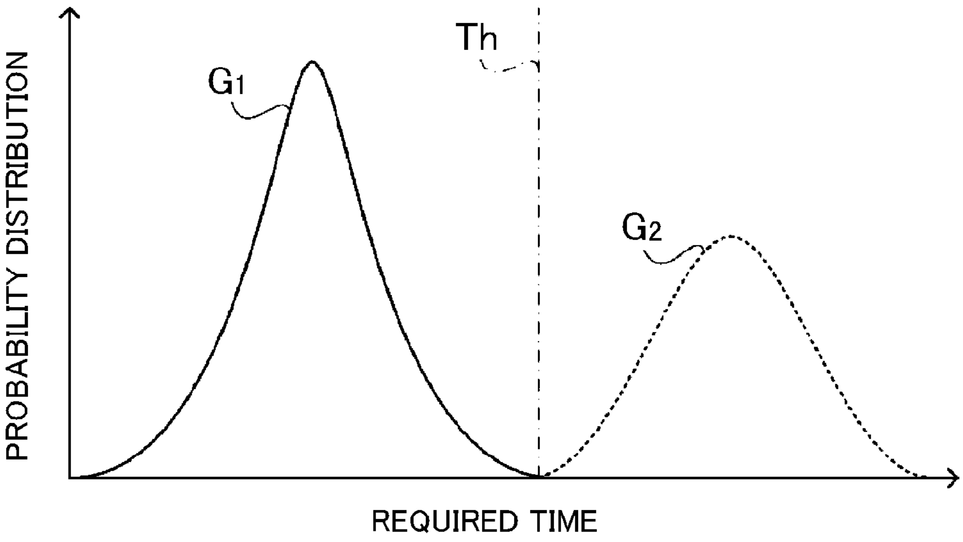
FIG. 4A
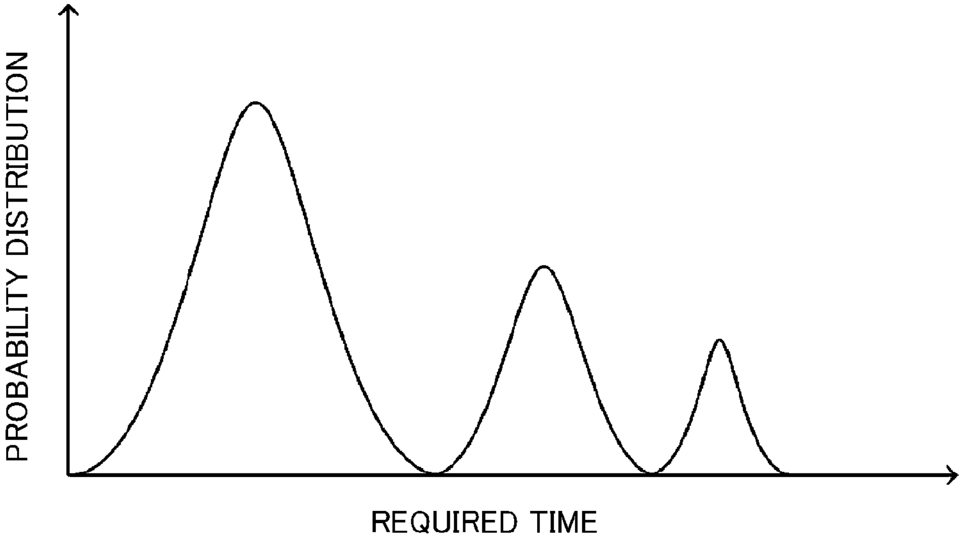
FIG. 4B

TRAVEL PATTERN INFORMATION OBTAINING DEVICE, TRAVEL PATTERN INFORMATION OBTAINING METHOD, AND TRAVEL PATTERN INFORMATION OBTAINING PROGRAM

TECHNICAL FIELD

The present invention relates to a travel pattern information obtaining device, method, and program for obtaining information specifying a travel pattern of a vehicle.

BACKGROUND ART

Art for performing guidance corresponding to the coordinated lighting of a plurality of traffic signals is currently known. For example, Japanese Patent Application Publication No. JP-A-2001-165684 discloses art in which up to two nodes ahead are used as a reference range. When the traffic signals within the reference range operate in association, such traffic signals are not used to calculate a traffic signal cost, however, when the traffic signals do not operate in association, the traffic signal cost is calculated.

Patent Citation 1: Japanese Patent Application Publication No. JP-A-2001-165684

DISCLOSURE OF INVENTION

Technical Problem

A vehicle traveling on a road that is influenced by external factors, such as a road on which the travel of a vehicle is controlled by traffic signals with coordinated lighting, the probability of a plurality of vehicles taking similar motion can be estimated to a certain degree. However, no art has existed in the past for preparing information in order to enable such estimation.

Namely, although related art describes a plurality of traffic signals with coordinated lighting, such related art offers no guide for generating information that indicates whether the traffic signals are linked, and coordinated traffic signals are assumed as a precondition. However, in reality the content of controls for coordinating traffic signals is often not disclosed, and preparing accurate information for estimating the content of such coordinating controls and the like has been difficult.

The present invention was devised in light of the foregoing problem, and it is an object of the present invention to generate information for estimating a motion of a vehicle traveling on a road.

Technical Solution

In order to achieve the above object, according to the present invention, vehicle speed identification information for identifying vehicle speed of a vehicle on a road is obtained for a plurality of vehicles. Based on a distribution of the vehicle speed identification information, the vehicle speed identification information is classified into groups corresponding to a motion of the vehicle. An occurrence probability of the motion of the vehicle is obtained based on the classification. Namely, when the vehicle performs various motions on a road, a resulting vehicle speed is the vehicle speed corresponding to the motion. Thus, a comparison of vehicles with similar vehicle speed identification information on a specific road makes it possible to estimate that the vehicles are performing a similar motion.

Hence, in the present invention, by classifying the vehicle speed identification information into one or more groups based on the distribution of the vehicle speed identification information, the vehicle speed identification information included in a group can be considered as corresponding to a specific motion of the vehicle. As a consequence, based on the vehicle speed identification information, a distribution of possible motions performed by the vehicle can be estimated. Therefore, based on the occurrence probability of the classified group, the occurrence probability of a motion of the vehicle can be obtained. The occurrence probability for a motion of the vehicle corresponds to the probability that the vehicle traveling on the road will perform such a motion, and thus enables an estimation of the motion of the vehicle traveling on the road.

Here, the vehicle speed identification information obtaining unit is not limited provided that the vehicle speed identification information obtaining unit is capable of obtaining vehicle speed identification information that can specify vehicle speed of vehicles. Thus, various information can be used for the vehicle speed identification information, including information indicating the vehicle speed itself, or information indicating a required time when traveling in a specific section. Namely, various information can be used as the vehicle speed identification information provided that the motion of the vehicle can be estimated by forming a group based on the vehicle speed and information corresponding to the vehicle speed.

Note that the vehicle speed identification information is preferably information actually measured for each vehicle, and various structures may be adopted wherein the actual measurement is performed in each vehicle, or performed by a facility installed around the road. The targeted road from which the vehicle speed identification information is obtained may be determined in advance, and a road in any sections can be designated as a target from which the vehicle speed identification information is obtained. Naturally on a general road, the travel direction of the vehicle can change, depending on a right or left turn and the like, before or after traveling on the road designated as the target from which the vehicle speed identification information is obtained or while traveling on the road. Such a motion of the vehicle can signify a motion influenced by traffic congestion or the like. Therefore, in the vehicle speed identification information obtaining unit, the vehicle speed identification information may be obtained for all vehicles traveling on the road, or the vehicle speed identification information may be selected for classification based on various conditions, such as right and left turns, straight travel, and whether there is traffic congestion.

The vehicle speed identification information classifying unit is not limited provided that the vehicle speed identification information classifying unit classifies the vehicle speed identification information into one or more groups, based on the distribution of the vehicle speed identification information. Various structures may be adopted where the group corresponds to a motion of the vehicle, for example, a motion is specified in advance in order to classify the vehicle speed identification information into one or more groups. Alternatively, similar vehicle speed identification information may be classified into one or more groups, and the classification of the vehicle speed identification information finalized when the group is classified such that the group is associated with a motion of the vehicle.

Note that the distribution is not limited provided that the distribution contributes to the classification of the vehicle speed identification information into groups of similar information. For example, a histogram or probability distribution may be adopted as the distribution. Furthermore, the manner for classifying the vehicle speed identification information into one or more groups based on the distribution of the vehicle speed identification information can be realized by various clustering. For example, a nonhierarchical method such as the k-means method, or a hierarchical method such as Ward's method can be used to classify the vehicle speed identification information. Classification may also naturally be performed by a discriminant analysis that specifies a discriminant function.

The motion occurrence probability obtaining unit is not limited provided that the motion occurrence probability obtaining unit is capable of obtaining an occurrence probability of a motion of the vehicle, based on the classification. Namely, a ratio of a sample quantity comprising the group to a total sample quantity of the vehicle speed identification information is equivalent to an occurrence probability of the group. Therefore, the occurrence probability may be obtained based on the ratio being the occurrence probability of a motion of the vehicle corresponding to the group.

In addition, the target from which the vehicle speed identification information is obtained may be a road comprised by a plurality of road sections that are consecutive between two preset points, and the vehicle speed identification information obtained in each road section. Namely, based on the vehicle speed identification information for the plurality of road sections that are consecutive, if the vehicle speed identification information in each road section is classified into one or more groups to obtain the occurrence probability of a motion of the vehicle corresponding to a group, then it is possible to estimate the motions of the vehicle in each road section of the road comprised by the plurality of road sections that are consecutive. Accordingly, a series of motions when the vehicle is traveling on the road can be estimated. For example, for a road comprised by a plurality of road sections divided by traffic signals, obtaining the occurrence probability of a motion of the vehicle in each road section makes it possible to estimate the motions of the vehicle as influenced by the traffic signals.

The road comprised of the plurality of road sections that are consecutive may naturally have various shapes, and be a straight road or have curves. For example, if the road sections are consecutive straight sections, then a road comprised of the plurality of road sections is a straight road, whereas if intersecting road sections are employed as road sections that are consecutive, then a road comprised of the plurality of road sections is a curved road.

A motion in the road sections may be a motion dependent on a motion in a previous road section thereof. Namely, since the vehicle is traveling continuously through the plurality of road sections that are consecutive, a motion the vehicle performs in a certain road section can be dependent on a motion of the vehicle in a previous road section thereof. Hence, if a specific motion in a certain road section is set so as to be dependent on a previous road section thereof, then it is possible to estimate a motion of the vehicle traveling continuously through the plurality of road sections that are consecutive between two preset points.

Note that various structures may be adopted as a structure for defining a group such that a motion in a certain road section is dependent on a motion in a previous road section thereof. For example, a structure may be employed where the vehicle speed identification information for defining a group in a certain road section is defined so as to be dependent on the vehicle speed identification information in a previous road section thereof. That is, vehicle speed identification information when traveling through a plurality of road sections that are consecutive is structured so that information from the same vehicle can be identified as such (structured so that a series of vehicle speed identification information in road sections that are consecutive can be specified as such).

When the vehicle speed identification information in an nth (where n is a natural number) road section is classified into a specific group, the vehicle speed identification information in an (n+1)th road section obtained from the same vehicle as the vehicle speed identification information classified into a group is identified, and the vehicle speed identification information in the (n+1)th road section is classified into one or more groups. Based on the classification, the occurrence probability of a motion in the (n+1)th road section is then obtained. According to this structure, it is possible to define a motion of the vehicle in road sections that are consecutive as a motion dependent on the motion of the vehicle in a previous road section thereof.

Both ends of the road comprised of the plurality of road sections that are consecutive can be determined based on various principles. As an example, a structure may be adopted where definitions in map information used by a navigation device or the like are utilized in the present invention, e.g. a structure may be employed that refers to map information divided into layers such that higher-ranked layers have a lower density of nodes (number of nodes per unit area). Namely, nodes in a specific layer in the map information are referenced to identify both ends of the plurality of road sections that are consecutive using the nodes designated in the specific layer. In addition, a structure may also be adopted where the nodes in a layer ranked higher than the specific layer are referenced to select two points corresponding to both ends of the road comprised of the plurality of road sections that are consecutive.

In the map information with a hierarchy as described above, the node is information that includes coordination information and the like for each point set on a road. Aside from certain exceptions, a layer with a high node density generally has nodes set at shorter intervals on the road compared with a higher-ranked layer having a lower node density. Accordingly, road sections separated by nodes are longer in higher-ranked layers, and more nodes are generally set at intersections between main roads that are more important (in terms of a wide width, high traffic volume, and the like) than roads designated with nodes in a lower-ranked layer. Thus, when both ends of a road section are structured by nodes designated in a specific layer, selecting two nodes designated in a layer ranked higher than the specific layer enables easy designation of the road comprised of the plurality of road sections that are consecutive.

In addition, the occurrence probability of a motion may be converted into other information and then used. For example, since the motion in the road sections is a motion identified based on the vehicle speed identification information, the motion is a motion that corresponds to the vehicle speed of each vehicle. Accordingly, the motion classified into a group can be considered a motion that corresponds to a difficulty of travel when traveling from one of the road sections that are consecutive to the next. Hence, obtaining the occurrence probability for the motion makes it possible to obtain information specifying the difficulty of travel based on the occurrence probability.

The information specifying the difficulty of travel may adopt various forms. For example, a structure may be employed where the information specifying the difficulty of travel may be cost information (a number that increases in value as travel becomes more difficult) in a route search, and a larger occurrence probability for a motion signifying the vehicle is slow is accompanied by an increased cost. Also, the difficulty of travel when traveling from one of the road sections that are consecutive to the next may be a difficulty of travel when continuously traveling the road sections that are consecutive. Alternatively, the difficulty of travel may correspond to a difficulty of travel when traveling on one of the road sections that are consecutive, or correspond to a difficulty of travel at a boundary between one of the road sections that are consecutive and another, or correspond to both.

The manner for obtaining the occurrence probability of a motion of the vehicle by classifying vehicle speed identification information as in the present invention is also applicable as a program or method. The above-described travel pattern information obtaining device, program, and method include various forms, and may be realized as an individual travel pattern information obtaining device, or realized through the use of respective components provided in the vehicle and common parts. For example, it is possible to provide a navigation system, method, and program equipped with the above-described travel pattern information obtaining device. Furthermore, modifications can be made as appropriate such as using software for a portion or using hardware for a portion. The invention is also achieved as a recording medium of a program that controls the travel pattern information obtaining device. The recording medium of such software may naturally be a magnetic recording medium or a magneto-optic recording medium, and the same holds for any recording medium developed in the future.

BRIEF DESCRIPTION OF THE DRAWINGS

FIGS. 4A and 4B are drawings showing a probability distribution in a required time;

BEST MODE FOR CARRYING OUT THE INVENTION

Hereinafter, embodiments of the present invention will be described in the following order.

(1) Structure of Road Information Generation System
(1-1) Structure of Road Information Generation Device
(1-2) Structure of Navigation Device
(2) Cost Information Generation Processing
(3) Operation of Navigation Device
(4) Other Embodiments

(1) Structure of Road Information Generation System

(1-1) Structure of Road Information Generation Device

Figure 1:
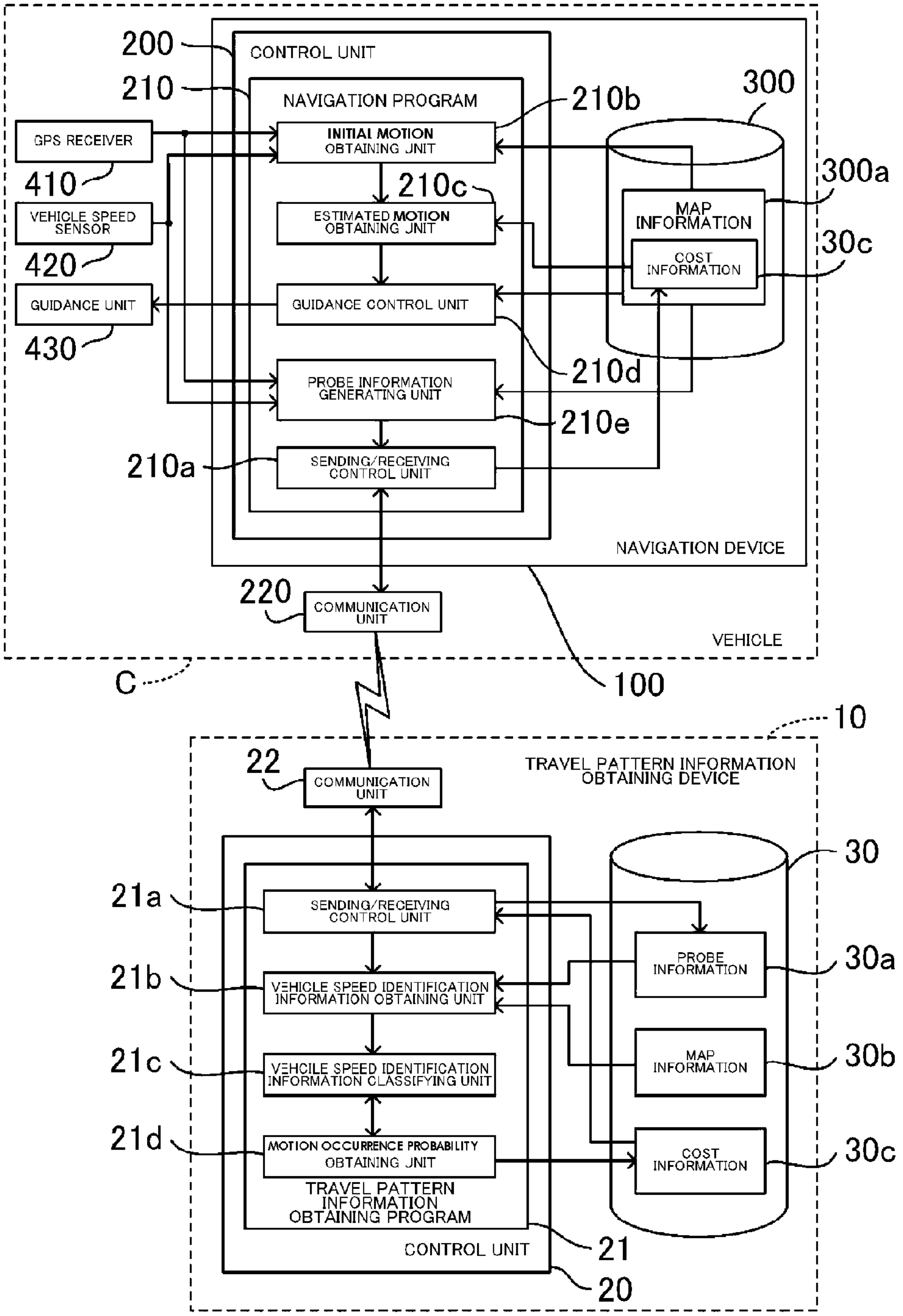
FIG. 1 is a block diagram showing a structure of a system that includes a travel pattern information obtaining device and a navigation device.

FIG. 1 is a block diagram showing a structure of a system that includes a travel pattern information obtaining device 10 installed in a road information control center and a navigation device 100 provided in a vehicle C. The travel pattern information obtaining device 10 includes a control unit 20 equipped with a CPU, a RAM, a ROM, and the like, and also includes a storage medium 30. Programs stored in the storage medium 30 and the ROM can be executed by the control unit 20. In the present embodiment, a travel pattern information obtaining program 21 can be executed as one such program, wherein information for estimating a travel pattern of the vehicle C on a road is obtained by the travel pattern information obtaining program 21.

According to the present embodiment, information for estimating the travel pattern is information that specifies the occurrence probability of a motion of the vehicle C on every road sections. This occurrence probability is obtained in the travel pattern information obtaining device 10 based on probe information output by a plurality of vehicles C. The travel pattern information obtaining device 10 generates cost information based on the occurrence probability, and sends the cost information to the vehicle C. To this end, the travel pattern information obtaining device 10 is equipped with a communication unit 22 comprised from a circuit for communicating with the navigation device 100. The control unit 20 is capable of receiving the probe information and sending the cost information via the communication unit 22.

In order to obtain the occurrence probability of a motion of the vehicle C per road section and generate and send the cost information, the travel pattern information obtaining program 21 is provided with a sending/receiving control unit 21*a*, a vehicle speed identification information obtaining unit 21*b*, a vehicle speed identification information classifying unit 21*c*, and a motion occurrence probability obtaining unit 21*d*. A function for generating and providing the cost information to the vehicle C is realized through the communication unit 22, the storage medium 30, the RAM of the control unit 20, and the like working in cooperation.

The sending/receiving control unit 21*a* is a module for controlling communication with the vehicle C. The control unit 20 controls the communication unit 22 through processing of the sending/receiving control unit 21*a*, and communicates with a communication unit 220 respectively mounted in the plurality of vehicles C. Namely, probe information sent from the vehicle C is obtained and recorded in the storage medium 30 in a state such that the probe information is identifiable as information obtained from the same vehicle C (probe information 30*a* shown in FIG. 1). Cost information 30*c* generated by processing described later is also obtained and sent to the vehicle C.

Note that the probe information 30*a* in the present embodiment includes at least vehicle speed identification information for identifying vehicle speed of the vehicle C, and according to the present embodiment also includes a link number specifying a road section (link) between nodes set on a road, a required time for the vehicle C to travel the road section corresponding to the link number, and an identifier specifying that the probe information 30*a* was obtained from the same vehicle C (an identifier capable of identifying that the probe information 30*a* is a series of vehicle speed identification information between road sections that are consecutive).

According to the present embodiment, by referring to map information 30*b* stored in the storage medium 30 and identifying a distance between road sections corresponding to the link numbers, it is possible to identify the vehicle speed at which the vehicle C traveled through the road sections. In other words, the map information 30*b* is stored in advance in the storage medium 30, and the map information 30*b* includes information that specifies a position of a node set on a road, as well as information that specifies a link number for identifying a link (road section) indicating connected nodes. Accordingly, the distance of the road section identified by the link number can be identified based on the positions of the nodes corresponding to both ends of the road section. Dividing the distance of the road section by the above required time enables identification of the vehicle speed when the vehicle C traveled through the road section. Therefore, in the present embodiment, information specifying the link number, the link required time, and the link distance, as well as the identifier indicating that such information is from the same vehicle, corresponds to the vehicle speed identification information. Naturally, a structure that defines information corresponding to the distance of each road section in the map information 30*b*, and identifies the distance of the road section based on such information may also be employed.

Note that, in the map information 30*b*, information specifying a hierarchy is associated with the node on the road. Namely, a plurality of virtual layers are set in the map information 30*b*, and the positions of the nodes are defined in each layer so that the road can be reproduced for each layer based on the link information between nodes in each layer. Also, a ranking is defined for each layer such that higher-ranked layers have a lower density of nodes (number of nodes per unit area). That is, aside from certain exceptions, a lower-ranked layer with a high node density generally has nodes set at shorter intervals on the road compared with a layer ranked higher. Accordingly, road sections separated by nodes are longer in higher-ranked layers. Furthermore, in the present embodiment, higher-ranked layers are set with more nodes at important (in terms of a wide width, high traffic volume, and the like) points (such as intersections between main roads).

The vehicle speed identification information obtaining unit 21*b* is a module for obtaining the vehicle speed identification information of a road in a predetermined section, based on the obtained probe information 30*a* and the map information 30*b* as described above. In the present embodiment, a road between intersections of main roads is set as a road in a predetermined section. Hence, the control unit 20 refers to the map information 30*b* through processing of the vehicle speed identification information obtaining unit 21*b* and extracts two nodes from a layer where nodes corresponding to the position of the intersection of the main roads are defined. A road in a section whose ends are the two nodes is set as the road in the predetermined section.

The control unit 20 also refers to data in a layer ranked lower than the layer from which the above two nodes were extracted in the map information 30*b*, and extracts from the lower-ranked layer the nodes set on a road identical to the road in the predetermined section. Adjacent nodes among these nodes correspond to end points of the road section. Once road sections that are consecutive using the nodes as end points are defined, it is possible to define road sections that are consecutive that comprise the above road in the predetermined section. After defining the road sections that are consecutive comprising the road in the predetermined section, the control unit 20 obtains vehicle speed identification information regarding the respective road sections sequentially. That is, the control unit 20 sets one end point of the road in the predetermined section as an origin and sets the other end point as a final point. The control unit 20 then sets a number n (where n is a natural number) that specifies an order of the road sections from the origin to the final point, and refers to the probe information 30*a* to obtain the vehicle speed identification information in order starting from the road section with the smallest number n.

The vehicle speed identification information classifying unit 21*c* is a module for classifying the vehicle speed identification information into one or more groups corresponding to a motion of the vehicle. The control unit 20 classifies a plurality of vehicle speed identification information obtained for the road section n by clustering. Such clustering is processing that classifies probability distributions (or histograms) of vehicle speed identification information into groups of mutually similar vehicle speed identification information. Once classification is complete, the group corresponds to a motion of the vehicle.

Note that, in the present embodiment, the vehicle speed identification information subject to clustering is dependent on the classification of the previous road section. In other words, to obtain a plurality of vehicle speed identification information in a road section (n+1), the plurality of vehicle speed identification information classified into a specific group in the road section n is referenced in order to specify the identifier thereof. Vehicle speed information in the road section (n+1) whose identifier is linked with the same identifier (identifier indicating obtainment from the same vehicle C) is extracted and classified into one or more groups. As a consequence, systematic groups are defined in order from the road section with the smallest number n, such that a plurality of vehicle speed identification information comprising one group for the number n is further classified into one or more groups for the number (n+1).

The motion occurrence probability obtaining unit 21*d* is a module for obtaining the occurrence probability of a motion of the vehicle C based on the above classification and generating the cost information 30*c* based on the occurrence probability. Namely, the control unit 20 considers the occurrence probability of the above group as the occurrence probability of a motion of the vehicle C corresponding to the group. The control unit 20 then obtains the occurrence probability of the motion of the vehicle C by dividing the sample number of the vehicle speed identification information comprising the group by the total sample number obtained for the road section. Based on the occurrence probability of the motion, the control unit 20 generates the cost information 30*c* specifying a difficulty of travel when traveling from one of the road sections that are consecutive to the next, which is stored in the storage medium 30.

Note that, as explained above, groups are systematically defined in order starting from the road section with the smallest number n, and therefore the above occurrence probability is also systematically defined in order starting from the road section with the smallest number n. In other words, the probability at which a certain motion will be performed in a certain road section (n+1) is dependent on whether a specific motion is performed in a previous road section n. Hence, in the present embodiment, the cost information 30*c* is also systematically defined in accordance with a dependency on the occurrence probability of the motion. For example, when the cost information 30*c* is set, based on the above occurrence probability, so as to have a smaller value for intersections corresponding to end points of road sections that are easier to go through, the motion of the vehicle in a road section 1 (an initial motion described later) is regulated into a plurality of types. Following the initial motion performed, the cost information corresponding to a series of motions performed by the vehicle is then linked to the initial motion and systematically defined.

According to the above processing, it is possible to generate the cost information 30*c* corresponding to the occurrence probability of a motion of the vehicle C. The occurrence probability is equivalent to estimating the motion of the vehicle C traveling on the road. By generating the cost information 30*c* based on such an estimation, it is possible to perform route guidance for the vehicle C that corresponds to this estimation.

(1-2) Structure of Navigation Device

The navigation device 100 is mounted in the vehicle C traveling on a road. The navigation device 100 includes a control unit 200 equipped with a CPU, a RAM, a ROM, and the like, and also includes a storage medium 300. Programs stored in the storage medium 300 and the ROM can be executed by the control unit 200. In the present embodiment, a navigation program 210 can be executed as one such program, wherein a route search using the above cost information 30*c* can be performed by the navigation program 210. The vehicle C according to the present embodiment can also generate and send the probe information 30*a* based on a road travel history.

To this end, the vehicle C is equipped with a communication unit 220 comprised of a circuit for communicating with the travel pattern information obtaining device 100. Through processing of a sending/receiving control unit 210*a*, the control unit 200 is capable of sending the probe information 30*a* and receiving the cost information 30*c* via the communication unit 220. Note that the cost information 30*c* obtained by the processing of the sending/receiving control unit 210*a* is stored along with map information 300*a* in the storage medium 300. Namely, the map information 300*a* defines layers and nodes similar to the above map information 30*b*, wherein the cost information 30*c* is recorded as associated with links between nodes and incorporated into the map information 300*a*.

The vehicle C is further provided with a GPS receiver 410, a vehicle speed sensor 420, and a guidance unit 430. The GPS receiver 410 receives radio waves from a GPS satellite and outputs information for calculating a current position of the vehicle via an interface (not shown). The control unit 200 receives a signal therefrom to obtain the current position of the vehicle. The vehicle speed sensor 420 outputs a signal that corresponds to a rotational speed of a wheel provided in the vehicle C. The control unit 20 obtains this signal via an interface (not shown) to obtain information on the speed of the vehicle C. The vehicle speed sensor 420 is utilized for correcting the correct position of the host vehicle as identified from the output signal of the GPS receiver 410, and the like. In addition, the current position of the host vehicle is corrected as appropriate based on a travel path of the host vehicle. Note that various other structures may be employed as the structure for obtaining information specifying the motion of the vehicle. Such conceivable structures include a structure that corrects the current position of the host vehicle based on an output signal of a gyro sensor, a structure that identifies the current position of the host vehicle using a sensor or a camera, and a structure that obtains host vehicle motion information using a signal from a GPS, a vehicle path on a map, vehicle-to-vehicle communication, road-to-vehicle communication, or the like.

In order to execute a route search using the cost information 30*c*, the navigation program 210 is provided with an initial motion obtaining unit 210*b*, an estimated motion obtaining unit 210*c*, and a guidance control unit 210*d*. The navigation program 210 is also provided with a probe information generating unit 210*e* for generating the probe information 30*a*, and works in cooperation with the communication unit 220, the storage medium 300, the RAM in the control unit 200, and the like.

The initial motion obtaining unit 210*b* is a module for obtaining information specifying an initial motion of the vehicle when travel starts on the road in the predetermined section. Namely, the control unit 200 obtains output signals from the GPS receiver 410 and the vehicle speed sensor 420 through processing of the initial motion obtaining unit 210*b*, and identifies a motion (position (longitude and latitude), vehicle speed, and travel direction) of the vehicle C.

Furthermore, the control unit 200 determines whether the position of the vehicle C is in a first road section (road section 1) among the plurality of road sections comprising the road in the predetermined section. If the position of the vehicle C is in the first road section, then the control unit 200 identifies the motion of the vehicle C as an initial motion. Note that the initial motion is not particularly limited provided that the initial motion can be defined in a manner that makes it possible to determine whether the initial motion matches an initial motion linked to the above cost information 30*c*. For example, a stopping motion or a motion of going through a road section without stopping may be linked to the cost information 30*c*. In such case, based on the output signals of the GPS receiver 410 and the vehicle speed sensor 420, the initial motion may be identified as being either the stopping motion or the motion of going through the road section without stopping.

The estimated motion obtaining unit 210*c* is a module for obtaining prescribed cost information linked to the initial motion. The control unit 200 refers to the map information 300*a* and obtains the cost information 30*c* linked to the initial motion of the vehicle C identified as described above. Since the cost information 30*c* is systematically set in accordance with the motions of the vehicle following the initial motion, processing for obtaining the cost information 30*c* corresponds to processing that indirectly obtains information specifying an estimated motion of the vehicle following an initial motion on the road in the predetermined section.

The guidance control unit 210*d* is a module for receiving input of a destination from an input portion (not shown), searching a route to the destination from a travel start point, and outputting guidance for traveling on the road to the guidance unit 430 (a display or the like). In the present embodiment, the guidance control unit 210*d* is further capable of achieving a function for performing a route search during travel and providing guidance for the searched route.

Namely, when the vehicle C is traveling on the first road section of the road in the predetermined section, the cost information 30*c* corresponds to a series of estimated motions following the initial motion in the first road section is obtained. Therefore, the control unit 200 performs a route search for after the first road section based on the cost information 30*c*. The control unit 200 provides the guidance for the searched route by guidance unit 430. As a consequence, when a plurality of road sections comprising the road in the predetermined section are included as route candidates to the destination, a route search accurately reflecting the difficulty of travel at intersections between the road sections can be performed and guidance provided.

The probe information generating unit 210*e* is a module for generating the probe information 30*a* corresponding to the motion of the vehicle C. The control unit 200 obtains the output signal of the GPS receiver 410 through processing of the probe information generating unit 210*e*, and identifies the position (longitude and latitude) of the vehicle C. Based on the motion of the vehicle C, the probe information 30*a* is then generated. That is, the control unit 200 refers to the map information 300*a* and identifies the link number of the road section where the position of the vehicle C resides. The required time for the road section is also obtained. Note that, according to the present embodiment, under a condition where the guidance control unit 210*d* provides matching through map matching processing executed during route guidance, the required time is defined by a difference between a time at which the vehicle C entered the road section and a time at which the vehicle C left the road section. However, the required time may naturally be identified based on the vehicle speed and the distance of the road section instead.

Information thus specifying the link number and the required time is linked to the above identifier and set as the probe information 30*a* by the control unit 200. Once the probe information 30*a* is generated, through processing of the sending/receiving control unit 210*a*, the control unit 200 sends the probe information 30*a* via the communication unit 220 to the travel pattern information obtaining device 10.

(2) Cost Information Generation Processing

Figure 2:
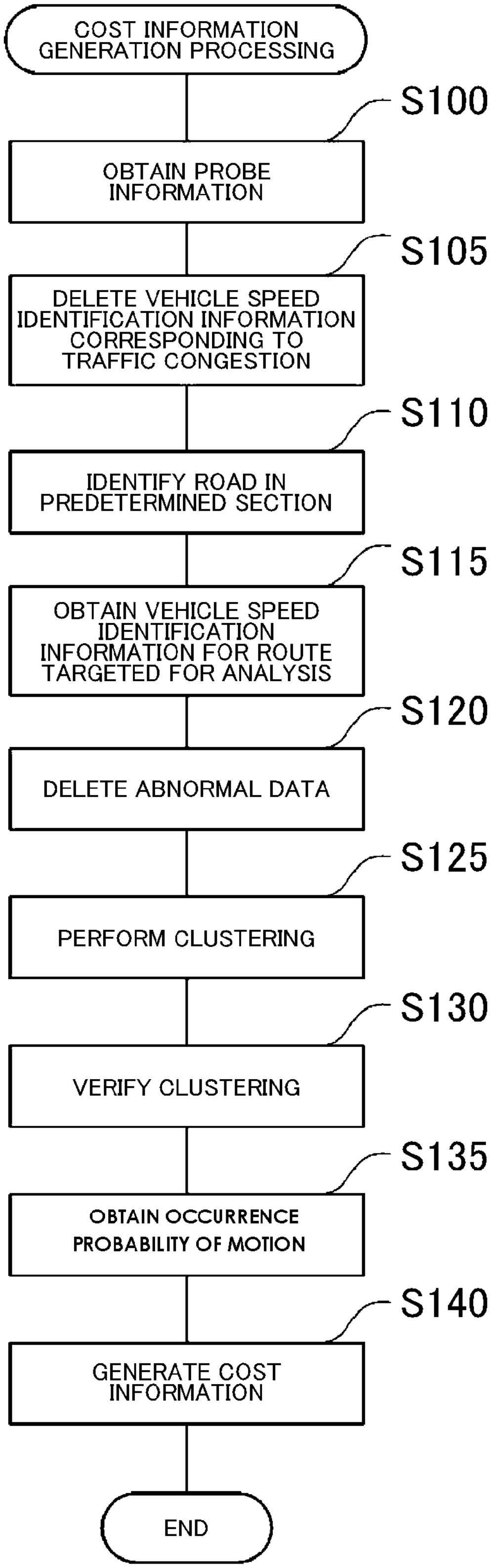
FIG. 2 is a flowchart showing cost information generation processing.

Cost information generation processing in the above structure will be described in detail here. FIG. 2 is a flowchart showing the cost information generation processing. In the present embodiment, this processing is executed at preset intervals. For such processing, the control unit 20 sequentially obtains the probe information 30*a* through processing of the sending/receiving control unit 21*a*, and sequentially records the probe information 30*a* in the storage medium 30 (step S100).

After the probe information 30*a* has been accumulated from a plurality of vehicles C, the control unit 20 through processing of the vehicle speed identification information obtaining unit 21*b* refers to the probe information 30*a* and obtains the vehicle speed identification information (steps S105 to S120). In the present embodiment, the control unit 20 first refers to the probe information 30*a* and deletes vehicle speed identification information corresponding to traffic congestion (step S105). Namely, an analysis performed in the present embodiment aims to identify a motion of the vehicle when traveling on the road in the predetermined section with the effect of traffic congestion eliminated. Therefore, vehicle speed identification information sent from the vehicle C during traffic congestion is excluded. Note that whether or not vehicle speed identification information corresponds to traffic congestion can be determined according to various criteria. For example, various structures can be employed, such as one in which vehicle speed identification information is determined as corresponding to traffic congestion when the vehicle travels through a road section at a speed less than 10 kilometers per hour for at least 300 consecutive meters.

Figure 3:
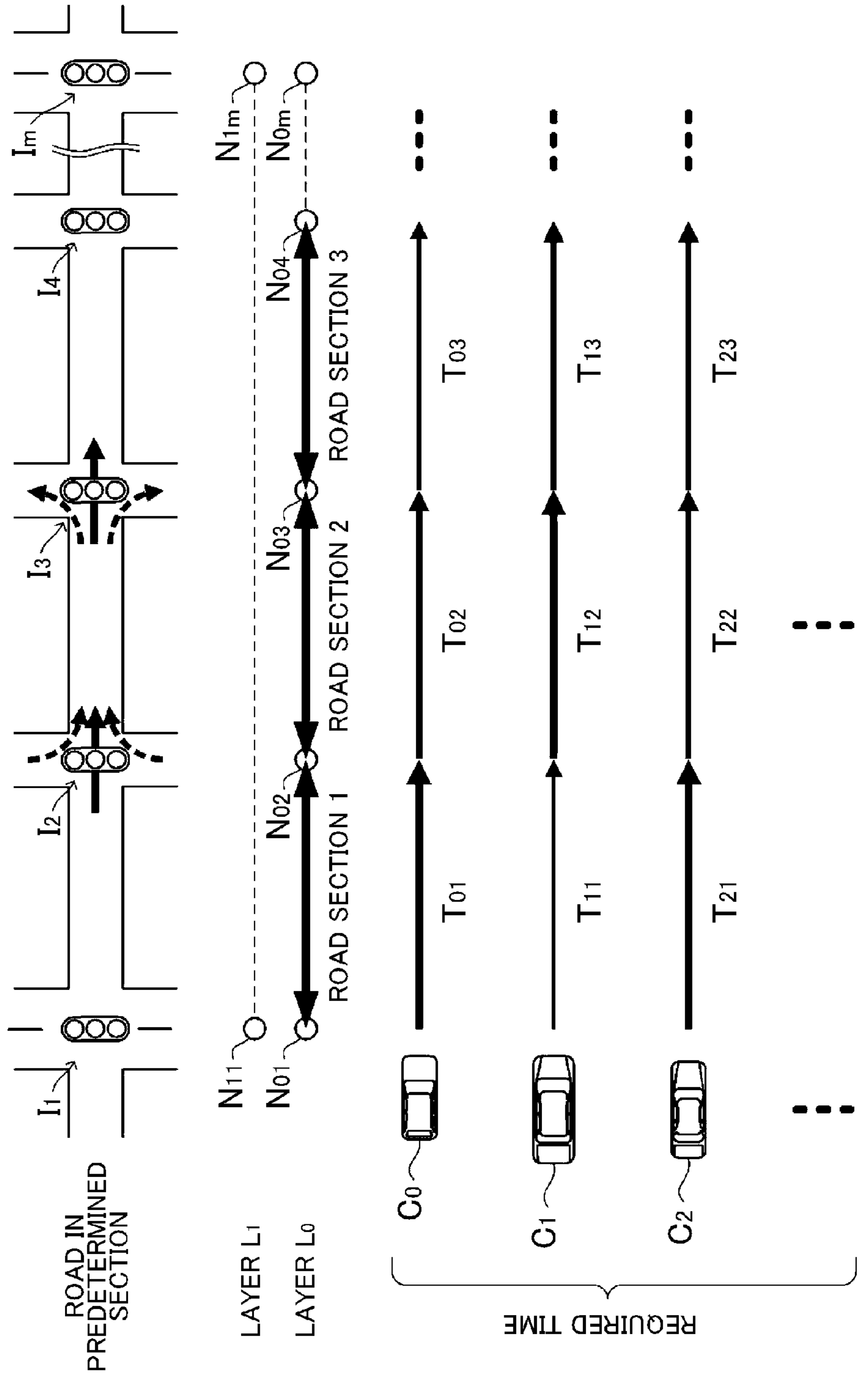
FIG. 3 is a drawing showing an example of a road set as a predetermined section.

The control unit 20 next identifies the road in the predetermined section (step S110). Namely, the control unit 20 identifies the intersections of main roads based on the map information 30*b*, and identifies a road between the intersections of the main roads as a road in a predetermined section. FIG. 3 shows an example of a road set as a predetermined section. As an example of the road in the predetermined section, the upper portion of FIG. 3 shows a straight road comprised of a plurality of road sections divided by intersections $I_1$ to $I_m$ (where m is a natural number) installed with traffic signals.

FIG. 3 also schematically shows a hierarchical structure of the map information 30*b*, 300*a* below the road. Specifically, the map information 30*b*, 300*a* are set with nodes corresponding to the positions of intersections in each layer. With respect to the road shown in FIG. 3, nodes $N_{11}$, $N_{1m}$ specifying the positions of the intersections $I_1$, $I_m$ of the main roads are defined in a layer $L_1$. In a layer $L_0$, which is a lower-ranked layer of the layer $L_1$, nodes $N_{01}$ to $N_{0m}$ specifying the positions of all the intersections $I_1$ to $I_m$ included in the road in the predetermined section are defined. Hence, the control unit 20 obtains the nodes $N_{11}$, $N_{1m}$ present in the layer $L_1$ based on the map information 30*b* to identify the road in the predetermined section. And in the layer $L_0$, the control unit 20 obtains the nodes $N_{01}$, $N_{0m}$ corresponding to the nodes $N_{11}$, $N_{1m}$ and identifies the nodes $N_{02}$ to $N_{0m-1}$ between the nodes $N_{01}$, $N_{0m}$. Road sections corresponding to each of the road between adjacent nodes among the nodes $N_{01}$ to $N_{0m}$ are subsequently identified as the plurality of road sections that are consecutive.

Furthermore, for the vehicle C traveling on the road in the predetermined section, the control unit 20 obtains only the vehicle speed identification information sent by the vehicle C that traveled on a predetermined route (route targeted for analysis), and excludes the vehicle speed identification information sent by the vehicle C that traveled on a route other than the route targeted for analysis (step S115). That is, in the present embodiment, the route targeted for analysis is a route that passes through all roads in the predetermined section. The control unit 20 refers to the identifiers included in the probe information 30*a* and if there are no identifiers indicating the same vehicle throughout all the roads in the predetermined section, then the control unit 20 excludes the vehicle speed identification information linked with such identifiers. For example, since the road in the predetermined section shown in FIG. 3 is a road with a linear configuration, a route traveling straight through all of the predetermined section is set as the route targeted for analysis, and vehicle speed identification information sent from vehicles traveling on other routes (e.g. routes indicated by dashed arrows at the intersections $I_2$, $I_3$ in FIG. 3) is excluded.

In addition, the control unit 20 excludes abnormal data from the vehicle speed identification information regarding the route targeted for analysis obtained as described above (step S120). Here, abnormal data refers to vehicle speed identification information considered statistically insignificant among a plurality of vehicle speed identification information. For example, abnormal data can be determined using various rejection tests (such as the Masuyama, Thompson, or Smirnov rejection tests) and vehicle speed identification information deemed abnormal data excluded.

Note that, below the nodes in FIG. 3, vehicle speed identification information obtained from the plurality of vehicles C (vehicles $C_0$ to $C_2$) traveling in the respective road sections is schematically shown. Specifically, FIG. 3 exemplifies the road sections 1 to 3, and shows below the road section 1 arrows indicating required times $T_{01}$, $T_{11}$, $T_{21}$ when the vehicles $C_0$ to $C_2$ traveled through the road section 1. The thickness of the arrows schematically represents the magnitude of required time. Note that the required time for the road section 2 is shown as $T_{02}$, $T_{12}$, $T_{22}$, and the required time for the road section 3 is shown as $T_{03}$, $T_{13}$, $T_{23}$.

There are various required times for the vehicle C depending on the vehicle as shown in the lower portion of FIG. 3. However, if a statistically significant number of samples of the required time is collected, depending on a distribution thereof it is possible to estimate a motion of the vehicle in the road sections. Hence, the control unit 20 in the present embodiment through processing of the vehicle speed identification information classifying unit 21*c* classifies the vehicle speed identification information after the exclusion of abnormal data into one or more groups using clustering. FIG. 4A is a graph exemplifying a probability distribution of the required time based on the vehicle speed identification information in a certain road section, where a horizontal axis shows the required time and a vertical axis shows the probability distribution.

Such a probability distribution of the required time in a road section is a distribution corresponding to a motion of the vehicle C in the road section. That is, if there is a high possibility of the vehicle C performing a specific motion, then there is a large distribution for the required time corresponding to that motion. For example, peaks appear in the distribution at certain required times as shown in FIG. 4A. In many cases, the required time of a road section has a distribution divided into two or three peaks. Hence, an example will be described here of two distributions respectively corresponding to either a stop motion of the vehicle C in a road section or a go motion where the vehicle C goes through the road section without stopping.

FIG. 4A illustrates an example where the probability distribution roughly forms two groups. In this example, when clustering is performed this distribution can be classified into two groups (a group $G_1$ with a short required time (indicated by a solid line in FIG. 4A) and a group $G_2$ with a long required time (indicated by a dashed line in FIG. 4A). Note that for the clustering algorithm, a nonhierarchical method such as the k-means method, or a hierarchical method such as Ward's method may be employed. For example, k-means clustering can be performed according to the following procedure.

1) Identify an M number (where M is a natural number) of random centers and define such centers as the centers of groups 1 to M.

2) Compare the required times with the centers of the groups 1 to M and temporarily classify the required times into groups around the nearest center.

3) If temporary classifications of all the required times is equivalent to previous temporary classifications, then clustering is finalized based on the temporarily classified groups. If any temporary classification of the required times is different from a previous temporary classification, then centroids of the groups are defined as new centers and processing of the above step 2 onward is repeated.

Note that in the case of two groups as shown in FIG. 4A, once clustering is finalized based on temporarily classified groups 1, 2, the groups 1, 2 are set as either of the above groups G1, G2. Furthermore, if there is a risk that proper classification cannot be achieved due to an inappropriate center defined in the above step 1, then an initial center may be determined while making assumptions regarding a proper classification. For example, a threshold (threshold Th indicated by a dashed-dotted line in FIG. 4A) that maximizes a dispersion between groups may be determined according to Otsu's method or the like and initial groups pre-identified, after which centers thereof are then determined. Various other structures may naturally be employed here. A discriminant analysis method may also be adopted, as well as various structures such as one where a distribution peak is set as a center.

Figure 5:
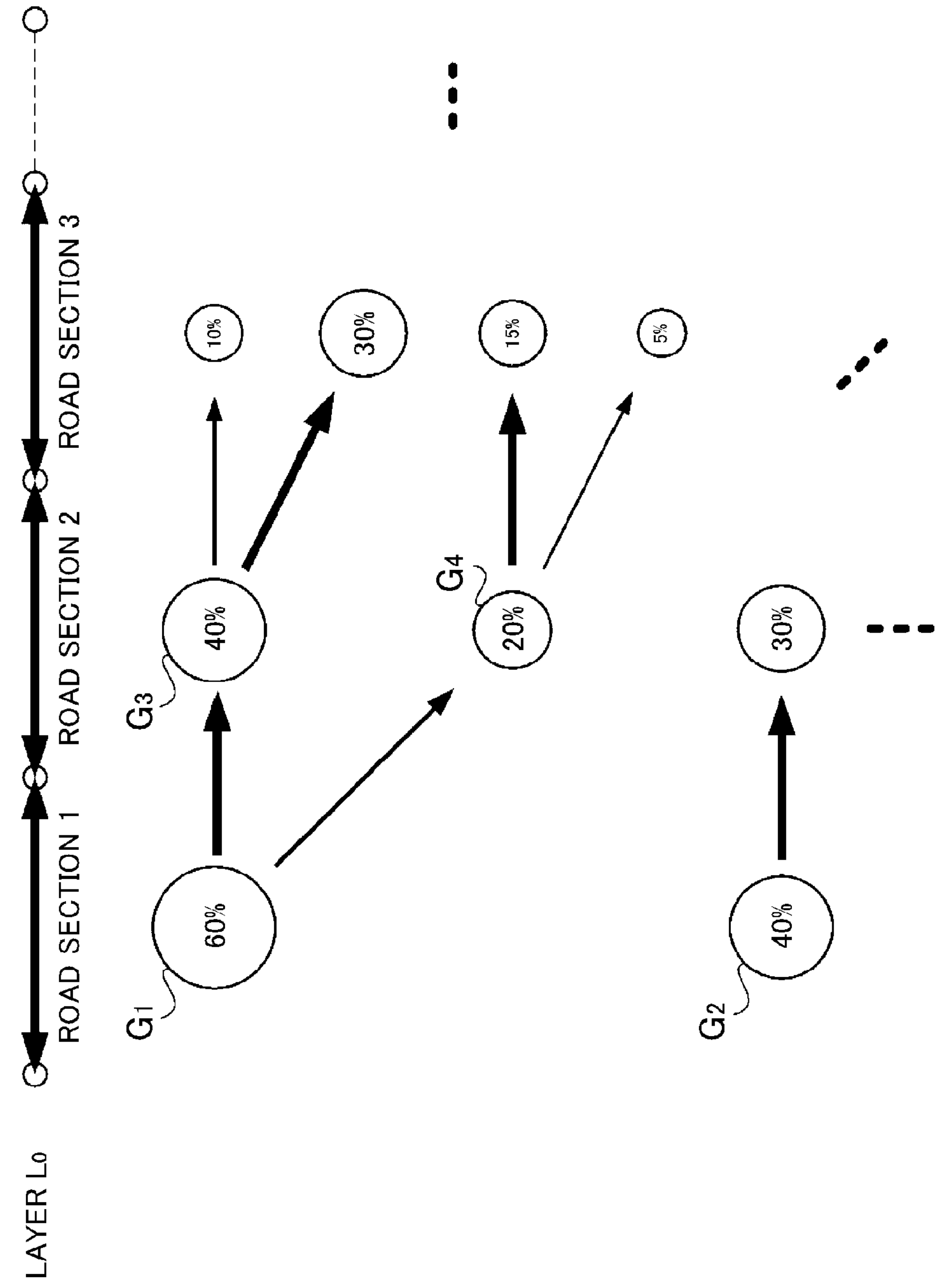
FIG. 5 is a drawing showing groups in road sections.

The above clustering is performed for vehicle speed identification information in the respective road sections, and excluding the initial road section, the population of the vehicle speed identification information targeted for analysis in the road section (n+1) is dependent on the group in the road section n. FIG. 5 is a schematic diagram showing groups in road sections, and shows an initial three road sections (road sections 1 to 3) among the road sections structuring the road in the predetermined section. Below the road sections 1 to 3, groups classified by clustering are shown by open circles.

As FIG. 5 illustrates, when the vehicle speed identification information sent from the vehicle C traveling in the road section 1 is classified into the groups $G_1$, $G_2$, then in the road section 2 clustering is performed twice based on the vehicle speed identification information corresponding to the groups $G_1$, $G_2$, respectively. In FIG. 5, vehicle speed identification information linked to an identifier (an identifier indicating such information was obtained from the same vehicle C), which is the same identifier linked to the vehicle speed identification information classified into the group $G_1$ in the road section 1, is extracted from the vehicle speed identification information in the road section 2. Clustering is then performed using these as the population, and FIG. 5 shows the results thus classified into groups $G_3$, $G_4$. Naturally, clustering is performed in a similar manner for the vehicle speed identification information linked to an identifier that is the same as one in identifier linked to the vehicle speed identification information classified into the group $G_2$ in the road section 1, and the results are classified into one or more groups. As described above, systematic groups are defined such that a plurality of vehicle speed identification information comprising one group in the road section 1 is further classified into one or more groups in the road section 2 onward, and the group in the road section (n+1) is dependent on the group in the road section n. Note that FIG. 5 additionally shows dependence in the system organization using right arrows.

As explained above, once systematic groups are defined for a plurality of road sections that are consecutive, in the present embodiment, the control unit 20 through processing of the vehicle speed identification information classifying unit 21*c* verifies the above clustering (step S130). The verification of clustering can be performed by a model evaluation based on the Akaike Information Criterion (AIC), for example. Namely, the number of groups G obtained as a result of clustering and an average required time or the like are used as parameters to calculate the AIC, and classification into appropriate groups is determined when the distribution is well approximated. Note that, when classification into appropriate groups has not been achieved, structures may be employed such as one where the vehicle speed identification information for the road section is deemed as belonging to one group, or one where clustering is performed again after changing the initial center or the like.

Next, the control unit 20 through processing of the motion occurrence probability obtaining unit 21*d* obtains the occurrence probability for a motion of the vehicle C corresponding to the groups (step S135). Namely, the groups are groups of approximate vehicle speed identification information. Therefore, vehicle speed identification information belonging to the same group is deemed as corresponding to the same motion. In the present embodiment, the two groups as described above correspond in the road section to the motion of the vehicle C stopping or the motion of the vehicle C going through without stopping, respectively.

Hence, at step S135, for the road section where the vehicle speed identification information is classified into two groups, the control unit 20 obtains the occurrence probability for each group, wherein the occurrence probability of the group corresponding to a short required time is obtained as the probability at which the vehicle C will go through the road section without stopping. Furthermore, the occurrence probability of the group corresponding to a long required time is obtained as the probability of the vehicle C stopping. For example, if the groups $G_1$, $G_2$ shown in FIG. 5 respectively correspond to the groups $G_1$, $G_2$ shown in FIG. 4A, then the occurrence probability (60% in the example of FIG. 5) of the group $G_1$ corresponding to the short required time is the probability at which the vehicle C will go through the road section without stopping. Meanwhile, the occurrence probability (40% in the example of FIG. 5) of the group $G_2$ corresponding to the long required time is the probability of the vehicle C stopping.

Once the occurrence probability for each motion is identified, the control unit 20 through processing of the motion occurrence probability obtaining unit 21*d* generates the cost information based on the occurrence probability (step S140). Namely, based on the occurrence probability of the motion, the control unit 20 generates the cost information 30*c* specifying a difficulty of travel when traveling from one of the road sections that are consecutive to the next, which is stored in the storage medium 30. In the present embodiment, a motion in the road section n indicates a difficulty of travel when traveling to the road section (n+1) from the road section n, and determines the cost at the intersection between the road section n and the road section (n+1).

For example, if a default cost at the intersection is defined as 100, then the cost at an intersection between the road sections n, (n+1) is 0 when the probability of stopping at the road section n is less than the probability of going through. Also, if the probability of stopping at the road section n is greater than the probability of going through without stopping, then the cost of the intersection between the road sections n, (n+1) is 100. Note that the motion of the vehicle C in the road section (n+1) is dependent on the motion of the vehicle C in the road section n. Therefore, the cost at a certain intersection is defined here as a systematic cost designed to be dependent on the cost of a previous intersection. Furthermore, in the present embodiment, the road section 1 is the first road section of the road in the predetermined section. Therefore, the systematic cost information is defined while associating subsequent costs with the initial motion in the road section 1.

Figure 6:
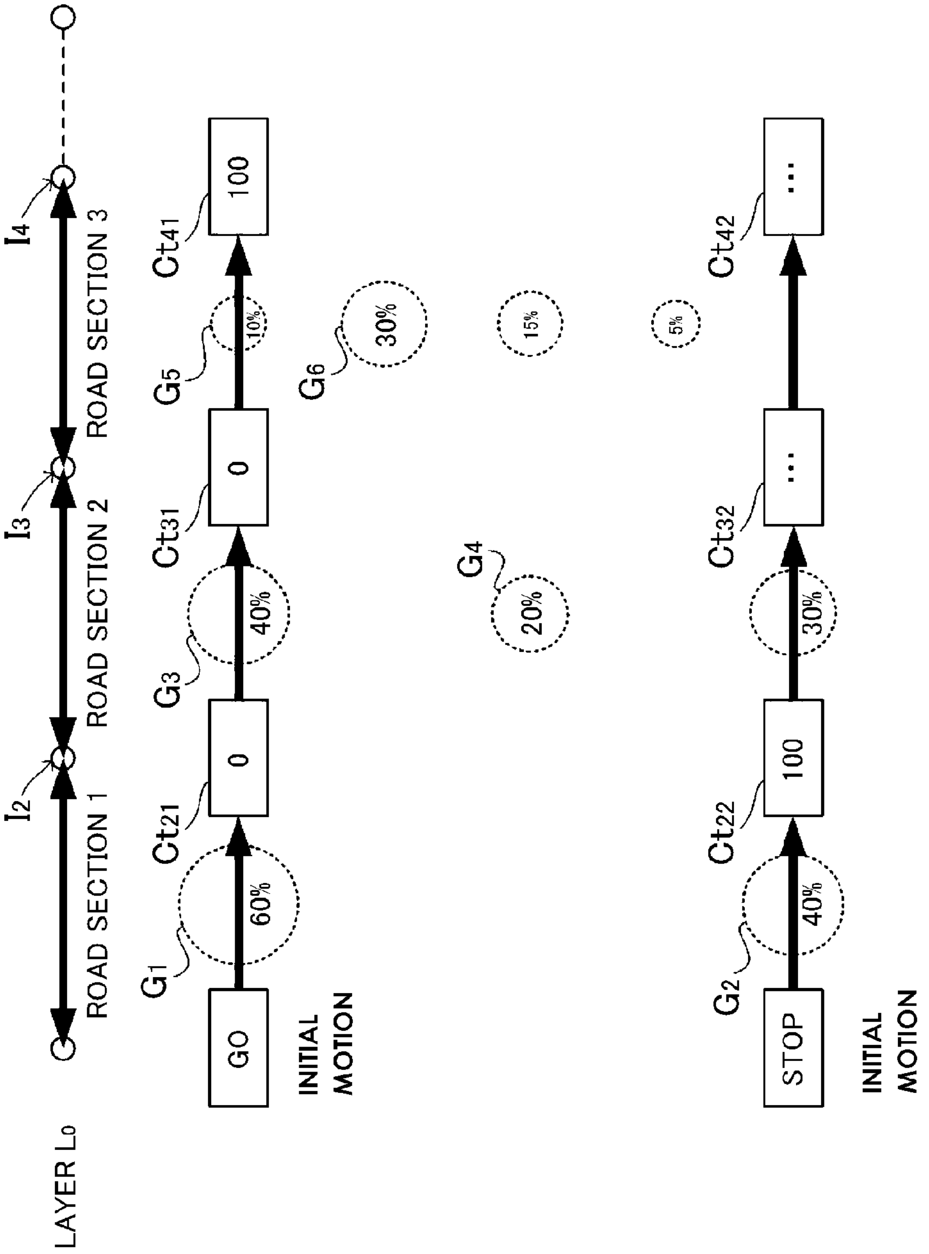
FIG. 6 is a drawing showing an example of systematic costs.

FIG. 6 is a drawing showing an example of systematic costs. FIG. 6 illustrates cost values determined based on the occurrence probability of the groups shown in FIG. 5, and a system thereof. In this example, the road section 1 corresponds to the first road section of the road in the predetermined section. Therefore, the motion in the road section 1 is divided into a go through without stopping motion and a stop motion, and costs are respectively associated with these motions.

For example, in the example of FIG. 6, the group $G_1$ corresponds to the motion of going through without stopping. Accordingly, the cost at the intersection $I_2$ is set to 0 (a cost $Ct_{21}$ shown in FIG. 6) and associated with the initial motion, i.e., the motion of going through without stopping. After the motion of going through without stopping is performed in the road section 1, the occurrence probability of the group $G_3$, which corresponds to the motion of going through the road section 2 without stopping, is greater than the occurrence probability of the group $G_4$, which corresponds to the motion of stopping. Therefore, the cost at the intersection $I_3$ is 0 (a cost $Ct_{31}$ shown in FIG. 6) and linked to the cost $Ct_{21}$.

After the motion (corresponding to the group $G_3$) of going through without stopping is performed in the road section 2, the occurrence probability of the group $G_5$, which corresponds to the motion of going through the road section 3 without stopping, is less than the occurrence probability of the group $G_6$, which corresponds to the motion of stopping. Therefore, the cost at the intersection $I_4$ is 100 (a cost $Ct_{41}$ shown in FIG. 6) and linked to the cost $Ct_{31}$. Note that FIG. 6 additionally shows the system organization using right arrows.

Meanwhile, since the group $G_2$ corresponds to a stop motion, the cost at the intersection $I_2$ is 100 and associated with the initial motion, i.e., the motion of stopping. Similar to the system when the initial motion is the motion of stopping, the cost at the intersection $I_3$ onward is identified, and the systematic cost information is generated by association with the cost of an immediately prior intersection. Once the cost information is generated as described above in the control unit 20, such cost information is recorded in the storage medium 30 as the cost information 30*c*.

(3) Operation of Navigation Device

Figure 7:
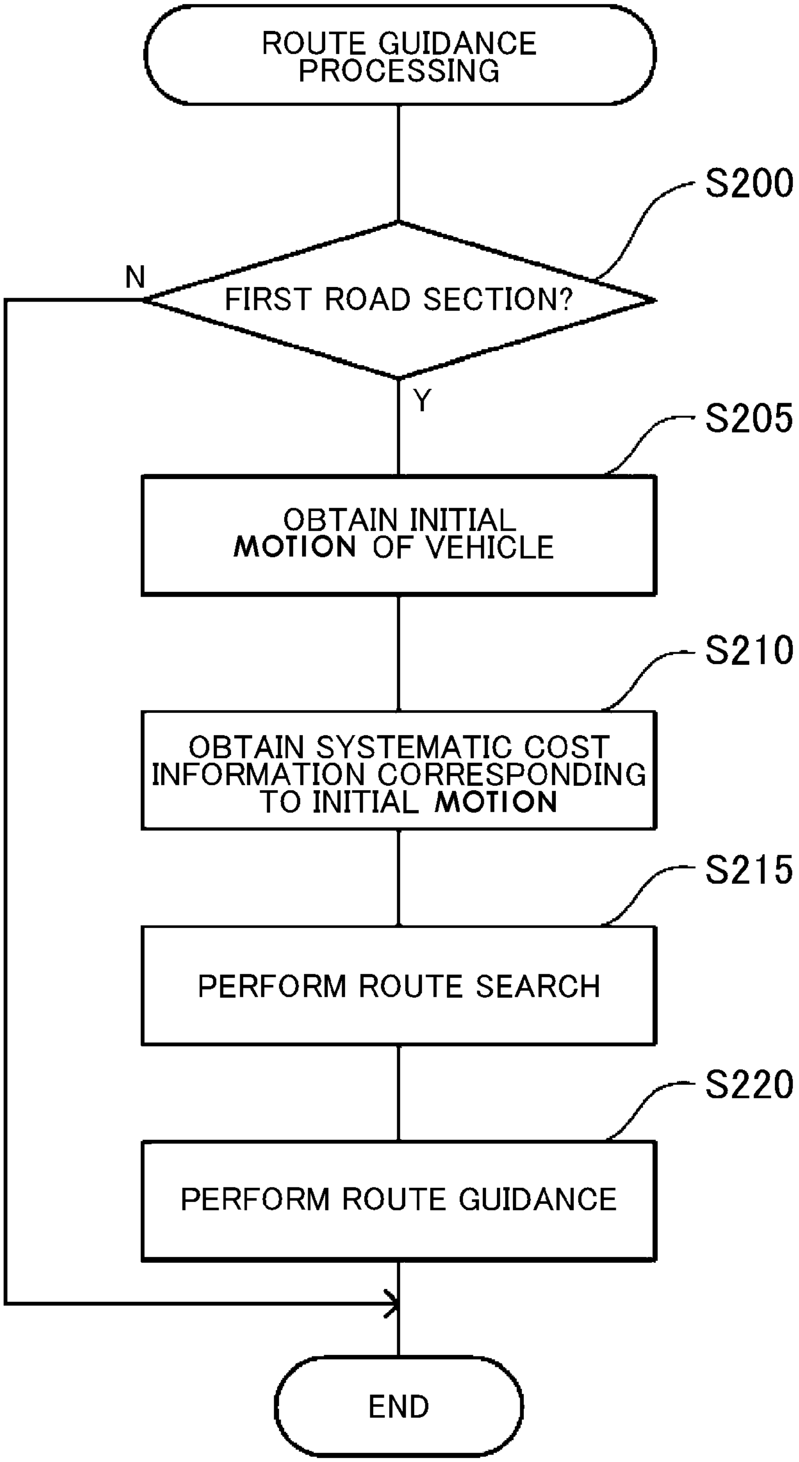
FIG. 7 is a flowchart of route guidance processing.

A route guidance operation utilizing the above cost information 30*c* in the navigation device 100 will be described here. The navigation program 210 searches a route from a travel start point to a destination and outputs guidance for traveling on the route to the guidance unit 430. FIG. 7 is a flowchart showing processing that is repeatedly executed at a predetermined time interval while such processing is being performed. At a stage prior to executing this processing, the control unit 200 has already obtained the cost information 30*c* through processing of the sending/receiving control unit 210*a* and incorporated the cost information 30*c* into the map information 300*a*.

In the processing shown in FIG. 7, the control unit 200 through processing of the initial motion obtaining unit 210*b* obtains information specifying an initial motion of the vehicle when travel starts on the road in the predetermined section. Namely, the output signal from the GPS receiver 410 is obtained to identify the position of the vehicle C, and the map information 300*a* is referenced to determine whether the current position is a first road section among road sections structuring the road in the above predetermined section (step S200). If it is determined that the current position is not the first road section, then the routine skips processing at step S205 onward.

If it is determined at step S200 that the current position is the first road section, then the control unit 200 obtains the motion of the vehicle C based on output information from the GPS receiver 410 and the vehicle speed sensor 420 through processing of the initial motion obtaining unit 210*b*, and identifies the motion as an initial motion (step S205). Note that the motion of the vehicle corresponding to the examples shown in the above FIGS. 4A and 5 is either a motion where the vehicle C stops or a motion where the vehicle C goes through without stopping. Accordingly, the control unit 200 in this example may adopt a structure that determines whether the output information of the vehicle speed sensor 420 is a value indicating the vehicle C is stopped in the road section 1, or that determines whether vehicle speed obtained after dividing the distance of the road section 1 by the required time is vehicle speed indicating the vehicle C is stopped.

Once the initial motion of the vehicle C is obtained, the control unit 200 through processing of the estimated motion obtaining unit 210*c* obtains the system cost information corresponding to the initial motion of the vehicle C (step S210). For example, if the initial motion is a motion corresponding to the vehicle C stopping, then system cost information (cost $Ct_{22}$, $Ct_{32}$, $Ct_{42}$, and so on) shown in the lower portion of FIG. 6 is obtained; however, if the initial motion is a motion corresponding to the vehicle C going through, then the system cost information (cost $Ct_{21}$, $Ct_{31}$, $Ct_{41}$, and so on) shown in the upper portion of FIG. 6 is obtained.

Through processing of the guidance control unit 210*d*, the control unit 200 then performs a route search based on the obtained system cost information (step S215), and outputs guidance for traveling on the obtained route to the guidance unit 430 (step S220). As a consequence, when a plurality of road sections structuring the road in the predetermined section are included as route candidates to the destination, a route search accurately reflecting the difficulty of travel at intersections between the road sections can be performed and guidance provided.

(4) Other Embodiments

The above embodiment is an example for carrying out the present invention. Various other embodiments may also be employed provided that the occurrence probability of a motion of the vehicle is obtained by classifying the vehicle speed identification information. Regarding classification of the vehicle speed identification information, for example, vehicles for which the vehicle speed identification information is similar on a specific road may be classified into the same group. As a consequence, it is possible to estimate that the vehicles that output vehicle speed identification information classified into respective groups are performing similar motions.

In addition, the vehicle speed identification information may employ various information provided that the motion of the vehicle can be estimated by forming groups based on the vehicle speed and information corresponding to the vehicle speed. The vehicle speed identification information is not limited to information that includes the required time as described above, and may also be information that indicates the vehicle speed itself. Furthermore, the vehicle speed identification information is preferably information actually measured for each vehicle, wherein the actual measurement may be performed by a structure in each vehicle, as well as by a facility installed around the road. Moreover, the road in the predetermined section may be determined in advance. In addition to a structure that identifies the predetermined section based on nodes defined in a layer ranked higher than a specific layer as described above, a road in any section may be designated as the road in the predetermined section.

Naturally the road in the predetermined section is not limited to a road with a linear configuration as mentioned above, and targets for obtaining vehicle speed identification information are not limited to only vehicle traveling straight. For example, if intersecting road sections are employed as the road sections that are consecutive, then a road in a predetermined section comprised of the plurality of road sections can be defined as a curved road. Furthermore, in the vehicle speed identification information obtaining unit, the vehicle speed identification information may be obtained for all vehicles traveling on the road, or the vehicle speed identification information may be selected for classification based on various conditions, such as right and left turns, straight travel, and whether there is traffic congestion. According to the above embodiment, the vehicle speed identification information is classified into one or more groups by clustering, and motions corresponding to the groups are identified. However, the motions may be identified in advance and the vehicle speed identification information classified such that groups are generated for each identified motion.

In the present embodiment, the probe information 30*a* is generated in the vehicle C based on the output signal of the GPS receiver 410 and the like. However, a structure may be adopted where the travel pattern information obtaining device 10 obtains the output signal of the GPS receiver 410 or the like to generate the probe information 30*a*.

Figure 8:
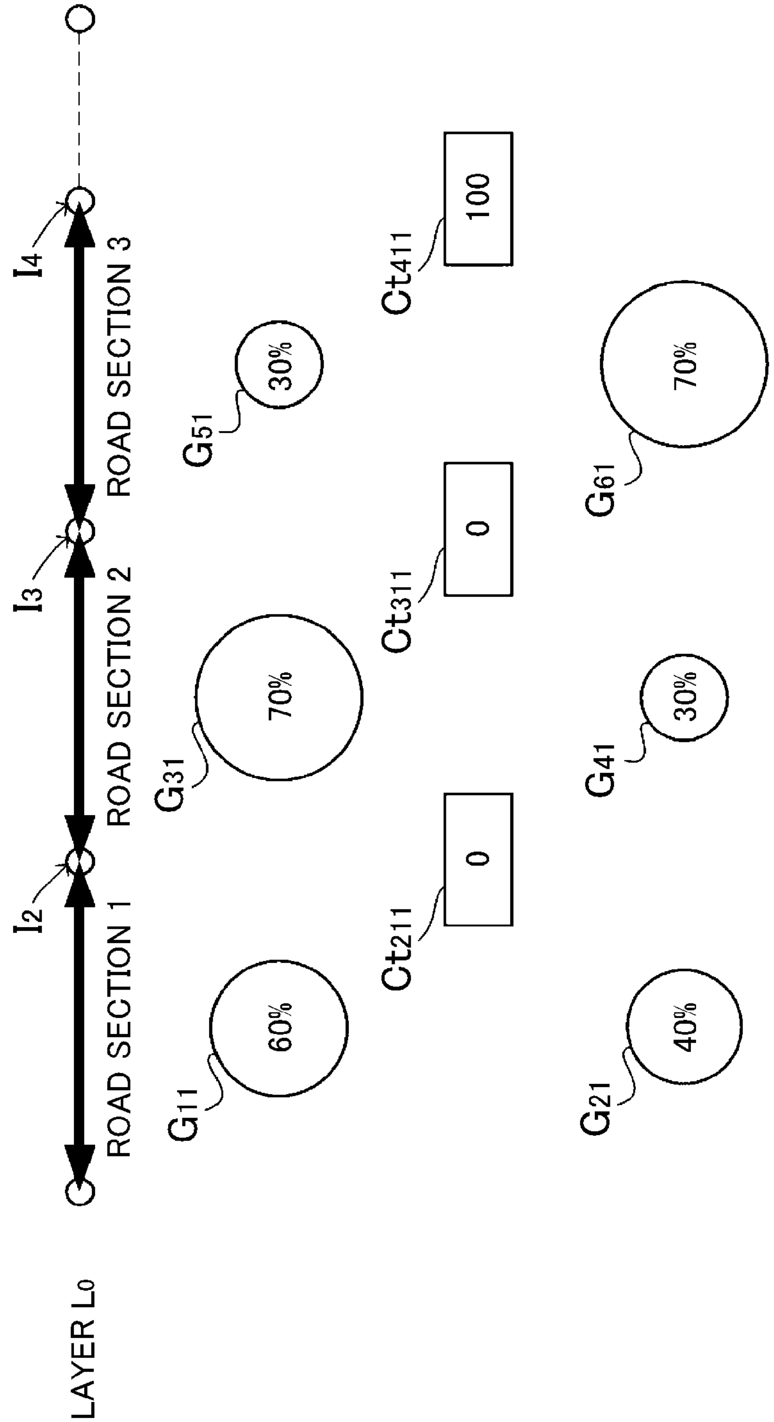
FIG. 8 is a drawing showing an example of groups and costs in road sections.

A further structure may be adopted where, regardless of the identifier described above, all vehicle speed identification information corresponding to each road section is subject to clustering to identify the motion in each road section. FIG. 8 illustrates an example of clusters for a road identical to the road shown in FIG. 3, when all vehicle speed identification information for each road section (excluding abnormal data and data corresponding to traffic congestion) is subject to clustering without dividing such information according to an identifier. FIG. 8 shows a state where the vehicle speed identification information for the road section 1 is classified into the groups $G_{11}$, $G_{21}$, the vehicle speed identification information for the road section 2 is classified into the groups $G_{31}$, $G_{41}$, and the vehicle speed identification information for the road section 3 is classified into the groups $G_{51}$, $G_{61}$. Note that in this example as well, the groups $G_{11}$, $G_{31}$, $G_{51}$ are groups that correspond to the motion of going through the road section without stopping, while the groups $G_{21}$, $G_{41}$, $G_{61}$ are groups that correspond to the motion of stopping in the road section.

According to the example shown in FIG. 8, the group $G_{11}$ (60%) has a greater sample number proportion than the group $G_{21}$ (40%). Therefore, the possibility of the vehicle C reaching the road section 2 without stopping in the road section 1 is higher than the possibility of the vehicle C stopping in the road section 1. A cost $Ct_{211}$ at the intersection $I_2$ is thus 0. Similarly, the group $G_{31}$ (70%) has a greater sample number proportion than the group $G_{41}$ (30%), therefore a cost $Ct_{311}$ at the intersection $I_3$ is 0; however, the group $G_{51}$ (30%) has a smaller sample number proportion than the group $G_{61}$ (70%), therefore a cost $Ct_{411}$ at the intersection L is 100. According to the above structure, the motion of a vehicle traveling on a road can be estimated as a cost, and a route search and route guidance can be performed based on such an estimation.

In the above embodiment, a structure is adopted where the motion in the first road section among the plurality of road sections structuring the road in the predetermined section is designated as an initial motion, and subsequent motions (or cost information) of the vehicle are associated with the initial motion. However, a structure may be adopted where a motion of the vehicle upon entering any road section of the road in the predetermined section is designated as an initial motion. For example, if the occurrence probability of groups is systematically defined as in FIGS. 5 and 6, it is possible to estimate the motion when traveling in a specific direction from any road section (namely, in the examples shown in FIGS. 5 and 6, a direction where the number n of the road increases).

As an example, the groups in the road section 2 can be classified into two groups corresponding to the motion of stopping in the road section 1 and two groups corresponding to the motion of going through the road section 1 without stopping. The four groups are then associated with the motions of stopping and not stopping in the road section 2. Accordingly, the four groups can be classified into groups corresponding to the motion of the vehicle stopping and the motion of the vehicle not stopping. Furthermore, the groups for the road section 3 onward are systematically associated with the groups in the road section 2. Therefore, once the motion when the vehicle C starts travel in the road section 2 is identified, it is possible to estimate subsequent motions.

The initial motion is not limited provided that the initial motion is a motion of the vehicle when starting travel in a road of the predetermined section, or, when the vehicle enters a preset road in the predetermined section and performs a specific motion, this motion can be obtained as the initial motion. Accordingly, a motion of the vehicle immediately before or immediately after entering the road in the predetermined section may be specified. In addition, the initial motion and the motion of the vehicle corresponding to a group is not limited to the motion of stopping and the motion of going through an intersection without stopping, and may be an average required time or the like in a road section, for example.

Since the motion of the vehicle obtained can differ depending on the time, a structure may also be adopted that associates the vehicle speed identification information with periods of time, performs clustering for each period of time, and links the motion of the vehicle and the cost information with a period of time. The clustering performed is not limited to the algorithm mentioned above, and classification may be performed by a discriminant analysis that specifies a discriminant function. In the above embodiment, classification into two groups was performed; however, a structure may naturally be adopted where classification into three or more groups is performed.

FIG. 4B shows a probability distribution in which the vehicle speed identification information may form three groups. To form such a distribution, classification into three groups is preferable. Furthermore, an X number of groups may be associated with unique motions whereby X types of motions can be obtained, or (X−1) or fewer types of motions can be obtained. For example, if the vehicle speed identification information forms three groups as in FIG. 4B, the three groups may be further classified into one group and two groups, wherein any one of the groups is associated with the motion of stopping and the other groups are associated with the motion of going through without stopping. Note that the verification of clustering shown at step S130 is particularly useful for classification into three or more groups.

The form of the cost information is not limited to a structure that sets values corresponding to either the motion of stopping or the motion of going through without stopping as described above, and a structure may be adopted where a numerical value fluctuates depending on the occurrence probability of the motion. For example, a structure may be employed where, if the default cost of 100 at an intersection is linked to a stop probability of 50% and the stop probability varies between 0%, 25%, 75%, and 100%, then the cost fluctuates between 0, 50, 150, and 200, respectively.

The invention claimed is:

1. A travel pattern information obtaining device comprising:

a vehicle speed identification information obtaining unit for obtaining vehicle speed identification information in order to identify vehicle speed of a vehicle on a road for a plurality of vehicles;

a vehicle speed identification information classifying unit for classifying the vehicle speed identification information into a group corresponding to a motion of the vehicle, based on a distribution of the vehicle speed identification information; and a motion occurrence probability obtaining unit for obtaining an occurrence probability of the motion of the vehicle, based on the classification characterized in that the vehicle speed identification information obtaining unit obtains the vehicle speed identification information of a plurality of road sections, respectively, that are consecutive between two preset points, the vehicle speed identification information indicating the vehicle speed or required time of the road sections, the vehicle speed identification information classifying unit classifies the vehicle speed identification information of each of the road sections into the group which is systematically defined in order from the road section with the smallest number n (natural number) such that a plurality of vehicle speed identification information for a road section (n+1) obtained by theplurality of vehicles that outputted a plurality of vehicle speed identification information comprising one group for a road section n is further classified into one or more groups, and the motion occurrence probability obtaining unit obtains the occurrence probability of the motion of the vehicle on each of the road sections based on the systematic classification, the occurrence probability being dependent on the occurrence probability of the motion of the vehicle on a previous road section of the road section.

2. The travel pattern information obtaining device according to claim 1, wherein the vehicle speed identification information obtaining unit refers to map information divided into layers such that a higher-ranked layer has a lower density of nodes, and extracts lower-layer-nodes, which are set on a road identical to a road between the two preset points, from the layer ranked lower than the layer that includes higher-layer-nodes corresponding to both ends of the road between the two preset points, to designate the lower- layer-nodes, as end points of each the road sections.

3. The travel pattern information obtaining device according to claim 1, wherein the motion occurrence probability obtaining unit obtains the occurrence probability for a motion of the vehicle that corresponds to a difficulty of travel when traveling from one of the road sections that are consecutive to the next, and obtains information specifying the difficulty of travel based on the occurrence probability.

4. The travel pattern information obtaining device according to claim 1, wherein the vehicle speed identification information classifying unit classifies the vehicle speed identification information into the group using clustering.

5. A travel pattern information obtaining method comprising the steps of:

obtaining vehicle speed identification information in order to identify vehicle speed of a vehicle on a road for a plurality of vehicles;

classifying in a classifying unit, the vehicle speed identification information into a group corresponding to a motion of the vehicle, based on a distribution of the vehicle speed identification information; and obtaining an occurrence probability of the motion of the vehicle, based on the classification, characterized in that the step of obtaining vehicle speed identification information comprises the step of obtaining the vehicle speed identification information of a plurality of road sections, respectively, that are consecutive between two preset points, the vehicle speed identification information indicating the vehicle speed or required time of the road sections, the step of classifying in a classifying unit, the vehicle speed identification information comprises the step of classifying the vehicle speed identification information of each of the road sections into the group which is systematically defined in order from the road section with the smallest number n (natural number) such that a plurality of vehicle speed identification information for a road section (n+1) obtained by the plurality of vehicles that outputted a plurality of vehicle speed identification information comprising one group for a road section n is further classified into one or more group, and the step of obtaining an occurrence probability comprises the step of obtaining the occurrence probability of the motion of the vehicle on each of the road sections based on the systematic classification, the occurrence probability being dependent on the occurrence probability of the motion of the vehicle on a previous road section of the road section.

6. A non-transitory computer readable storage medium comprising a travel pattern information obtaining program executed in a computer to perform the functions of:

obtaining vehicle speed identification information in order to identify vehicle speed of a vehicle on a road for a plurality of vehicles;

classifying the vehicle speed identification information into a group corresponding to a motion of the vehicle, based on a distribution of the vehicle speed identification information; and obtaining an occurrence probability of the motion of the vehicle, based on the classification, characterized in that the function of obtaining vehicle speed identification information comprises the function of obtaining the vehicle speed identification information of a plurality of road sections, respectively, that are consecutive between two preset points, the vehicle speed identification information indicating the vehicle speed or required time of the road sections, the function of classifying the vehicle speed identification information comprises the function of classifying the vehicle speed identification information of each of the road sections into the group which is systematically defined in order from the road section with the smallest number n (natural number) such that a plurality of vehicle speed identification information for a road section (n+1) obtained by the plurality of vehicles that outputted a plurality of vehicle speed identification information comprising one group for a road section n is further classified into one or more groups, and the function of obtaining an occurrence probability comprises the function of obtaining the occurrence probability of the motion of the vehicle on each of the road sections based on the systematic classification. the occurrence probability being dependent on the occurrence probability of the motion of the vehicle on a previous road section of the road section.

7. The travel pattern information obtaining device according to claim 2, wherein the motion occurrence probability obtaining unit obtains the occurrence probability for a motion of the vehicle that corresponds to a difficulty of travel when traveling from one of the road sections that are consecutive to the next, and obtains information specifying the difficulty of travel based on the occurrence probability.

8. The travel pattern information obtaining device according to claim 2, wherein the vehicle speed identification information classifying unit classifies the vehicle speed identification information into the group using clustering.

9. The travel pattern information obtaining device according to claim 5, wherein the vehicle speed identification information classifying unit classifies the vehicle speed identification information into the group using clustering.

10. The travel pattern information obtaining device according to claim 7, wherein the vehicle speed identification information classifying unit classifies the vehicle speed identification information into the group using clustering.

* * * * *

UNITED STATES PATENT AND TRADEMARK OFFICE

CERTIFICATE OF CORRECTION

PATENT NO. : 8,417,443 B2
APPLICATION NO. : 12/867102
DATED : April 9, 2013
INVENTOR(S) : Hiroki Ishikawa It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 275 days.

Signed and Sealed this
Twenty-seventh Day of August, 2013

Teresa Stanek Rea
*Acting Director of the United States Patent and Trademark Office*